United States Patent
Kaiser et al.

(10) Patent No.: US 7,281,888 B1
(45) Date of Patent: Oct. 16, 2007

(54) TOOL FOR CUTTING MACHINING

(75) Inventors: Heinz Kaiser, Wallisellen (CH); Ernst Hänggi, Niederglatt (CH); Rudolf Stadelmann, Niederuzwil (CH)

(73) Assignee: Heinz Kaiser AG (CH)

( * ) Notice: Subject to any disclaimer, the term of this patent is extended or adjusted under 35 U.S.C. 154(b) by 0 days.

(21) Appl. No.: 11/704,801

(22) Filed: Feb. 9, 2007

(30) Foreign Application Priority Data

Feb. 13, 2006 (CH) .................................. 00224/06

(51) Int. Cl.
B23C 5/22 (2006.01)
(52) U.S. Cl. ..................... 409/234; 408/239 R; 279/83; 403/379.3
(58) Field of Classification Search ................ 409/232, 409/234; 408/239 R, 238, 240; 279/83, 279/76; 82/158, 160; 403/379.3, 379.4, 403/362
See application file for complete search history.

(56) References Cited

U.S. PATENT DOCUMENTS

| | | | | |
|---|---|---|---|---|
| 4,575,292 A | * | 3/1986 | Pape et al. | 409/234 |
| 4,877,360 A | * | 10/1989 | Pfalzgraf | 409/234 |
| 4,915,523 A | * | 4/1990 | Andersson | 403/11 |
| 4,976,574 A | * | 12/1990 | Muendlein et al. | 409/232 |
| 5,110,240 A | * | 5/1992 | Zeilinger et al. | 409/234 |
| 5,137,401 A | | 8/1992 | Muendlein et al. | |
| 5,378,076 A | * | 1/1995 | D'Andrea | 403/379.4 |
| 5,388,936 A | * | 2/1995 | Mihic | 409/234 |
| 5,468,102 A | * | 11/1995 | Stojanovski | 409/234 |
| 6,299,180 B1 | * | 10/2001 | Satran et al. | 279/83 |
| 6,902,347 B2 | * | 6/2005 | Stolz et al. | 403/374.3 |

FOREIGN PATENT DOCUMENTS

DE 4210144 A1 * 9/1993
EP 0 547 049 A 6/1993

* cited by examiner

Primary Examiner—Erica Cadugan
(74) Attorney, Agent, or Firm—Lerner, David, Littenberg, Krumholz & Mentlik, LLP

(57) ABSTRACT

The tool exhibits a first tool part (2) and a second tool part (3), which possess a common axis of rotation (A). The first tool part (2) is provided with an alignment pin (4) and exhibits at its root an annular surface (5). The second tool part (3) possesses an axial bore (7) to receive the alignment pin (4) and an annular surface (6), which is capable of being tensioned against the annular surface (5) of the first tool part (2). Tensioning structures (8, 9, 10) serve for the axial tensioning of the two tool parts (2, 3) to one another. The tensioning structures (8, 9, 10) exhibit three retaining screws (8, 9, 10) arranged distributed around the periphery of the second tool part (3), which retaining screws are each screwed radially into a threaded bore (12, 13, 14) of the second tool part (3) and each engage in a radial bore (21, 22, 23) of the alignment pin (4). A recess (16, 17, 18) is allocated to each bore (21, 22, 23), so that the alignment pin (4) is caused to become polygonal at its periphery by tensioning the retaining screws (8, 9, 10) of the alignment pin (4). Higher stability and vibration damping can be achieved because of the polygonal bulging of the alignment pin (4). The tool is further characterized by its high compatibility and ease of operation.

10 Claims, 5 Drawing Sheets

TOOL FOR CUTTING MACHINING

The invention relates to a tool for cutting machining, having a first tool part and having a second tool part, which exhibit a common axis of rotation, the first tool part exhibiting an alignment pin and at its root an annular surface, and the second tool part exhibiting an axial bore to receive the alignment pin and an annular surface, which is capable of being tensioned against the annular surface of the first tool part with tensioning means for the axial tensioning of the two tool parts to one another.

The tool is in particular a drilling tool with a working head, which constitutes the first tool, and on which an alignment pin is arranged, which engages in a mating bore of a shaft. This shaft here constitutes the second tool part. Such tools have long been familiar in various embodiments.

Previously disclosed by EP-A-0 547 049 is a tool, in which the alignment pin exhibits a radial transcurrent bore, into which a clamping bolt, also known as a self-aligning bolt, is inserted. One end of the clamping bolt possesses an internal cone, into which an external cone of a retaining screw engages. The other end of the clamping bolt possesses an external cone, which engages into an internal cone of a second retaining screw. With the two retaining screws, the clamping bolt is tensioned axially in such a way that the alignment pin is drawn into the mating bore of a connection sleeve. The two annular surfaces are securely tensioned to one another in this way. The wall thickness and the material of the connection sleeve, the clearance between the alignment pin and the mating bore and the tensioning force are executed in such a way that the connection sleeve in the tensioned state is caused to expand elastically in the direction of the axis of the clamping bolt. In addition, the diameter of the matching bore is reduced in the transverse direction, and the connection sleeve is pressed against the outside of the alignment pin in this way. The matching bore accordingly adopts a more or less oval form in its cross section. Such elastic oval deformation of the connection sleeve and the second part of the tool is regarded as disadvantageous. Alternatively, and to avoid the aforementioned elastic deformation of the connection sleeve, it is proposed to achieve bridging of the clearance by causing bulging of the alignment pin. The intention is to make the aforementioned elastic deformation of the connection sleeve at least partially redundant or unnecessary in this way. In order to produce bulging of the alignment pin, it is proposed that this should exhibit an indentation extending over the transverse contact length to the inside of the transverse bore.

The object of the invention is to make available a tool of the aforementioned kind, in which an even higher flexural strength and more exact rotation are possible. In addition, the tool is intended to be user-friendly and capable of economical manufacture.

It has been found that, at an angle between the first securing screw and the second securing screw that is considerably larger than 90° and considerably smaller than 120°, it is possible to achieve surface pressure of a kind that is particularly symmetrically balanced. As a consequence, the bending moment is neutral in relation to the axis of rotation of the tool. The symmetrical arrangement of the surface pressure causes an advantageous, axially parallel connection of the two parts of the tool.

Tightening of the first and second retaining screw gives rise to a radial force, in addition to an axial force, which produces a frictional force between the alignment pin and the axial bore. The arrangement in accordance with the invention of the angle between the radial bores generates a resulting force which is greater than the force of the opposing retaining screw. The effect of this increased force in the axial direction compensates for the frictional force.

Instead of a four-point support means, a polygonal spread with three support points for the alignment pin in the axial bore can be achieved. On the one hand, the elastic deformation of the second tool part is smaller, and on the other hand this elastic deformation is not oval, but polygonal, which provides a more favorable symmetrical distribution of the elastic deformation. A higher rigidity of the connection between the two parts of the tool, and thus a higher chip removal capacity, result from the aforementioned contact points. It has also been found that operation is easier, since the three aforementioned retaining screws only need to be tightened in a single sequence. The previously necessary multiple tightening sequence can thus be avoided. The time taken to connect the two tool parts is shorter as a result.

Further advantageous characterizing features can be appreciated from the dependent patent claims, the following description and the drawing.

An illustrative embodiment of the invention is explained below in greater detail with reference to the drawing, in which.

Figure 5:
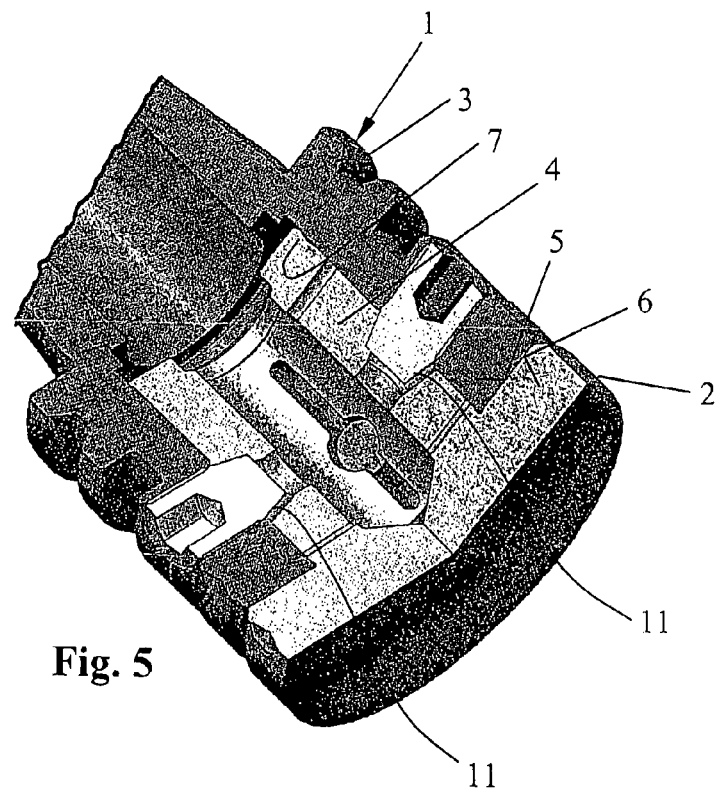
FIG. 5 depicts a three-dimensional view of a sectorally cut tool according to the invention.
Figure 7:
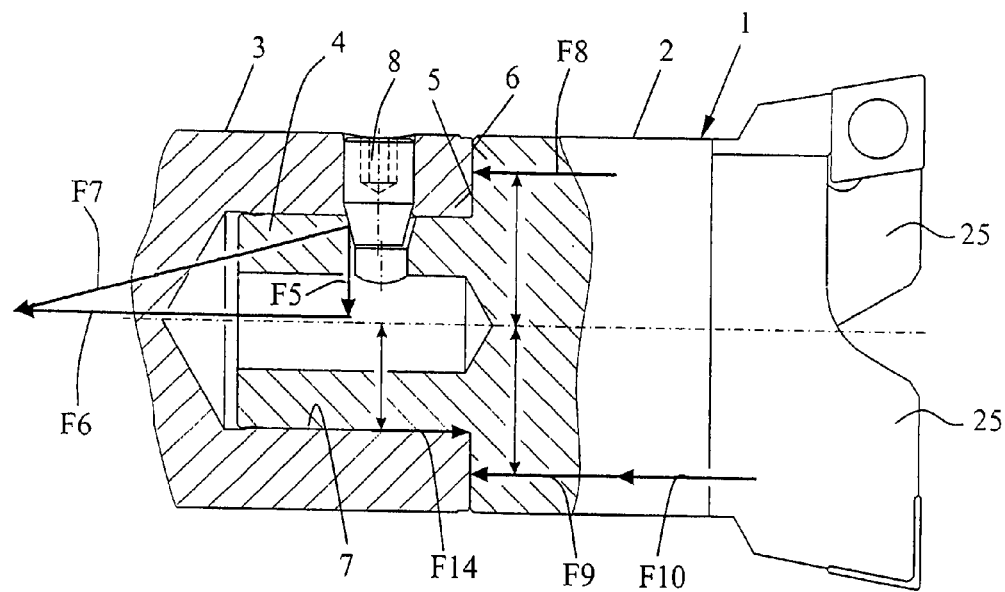
FIG. 7 depicts a partially sectioned tool according to the invention to explain the forces acting thereon.

The tool 1 possesses a first tool part 2, for example according to FIG. 5, which constitutes a working head, for example, which exhibits two cutter carriers depicted in FIG. 7. The tool part 1 is in particular a boring tool having one or two adjustable cutters. The aforementioned invention can also be used as a modular system for tools for boring. The first tool part 2 possesses an alignment pin 4, which is capable of being inserted with a specific clearance into an axial bore 7 in a second tool part 3. In the assembled state according to FIG. 5, an annular surface 5 of the first tool part 2 bears against an annular surface 6 of the second tool part 3. The two tool parts 2 and 3 possess a common axis of rotation A, and the two aforementioned annular surfaces 5 and 6 lie in a single plane, which runs transversely to this axis of rotation.

Figure 1:
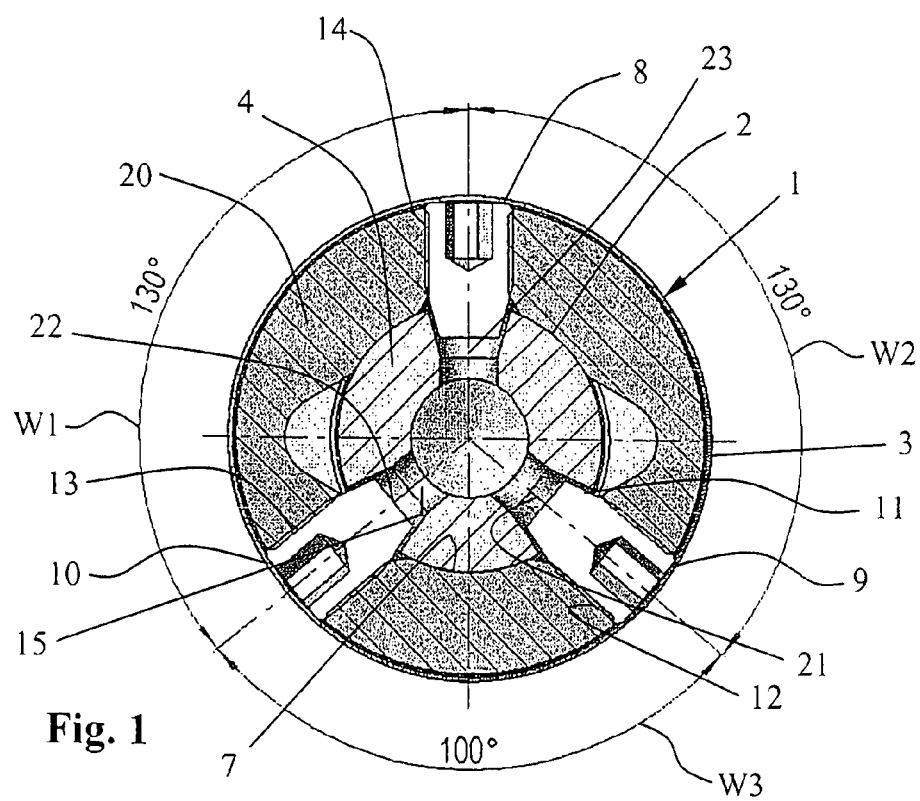
FIG. 1 depicts a section through the tool according to the invention.
Figure 6:
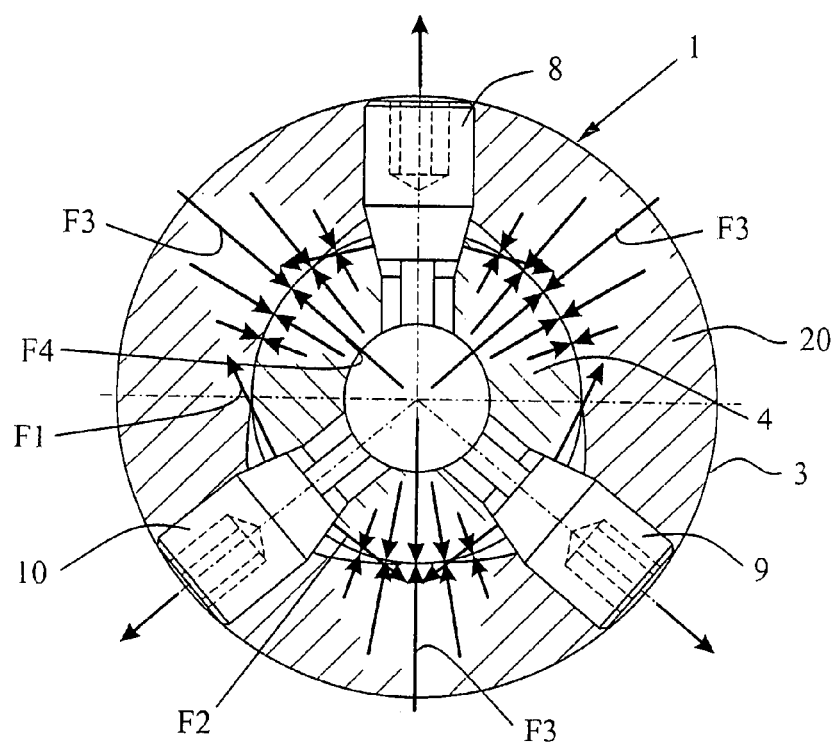
FIG. 6 depicts a section according to FIG. 1 to explain the surface pressure applied to the periphery of the alignment pin.
Figure 9:
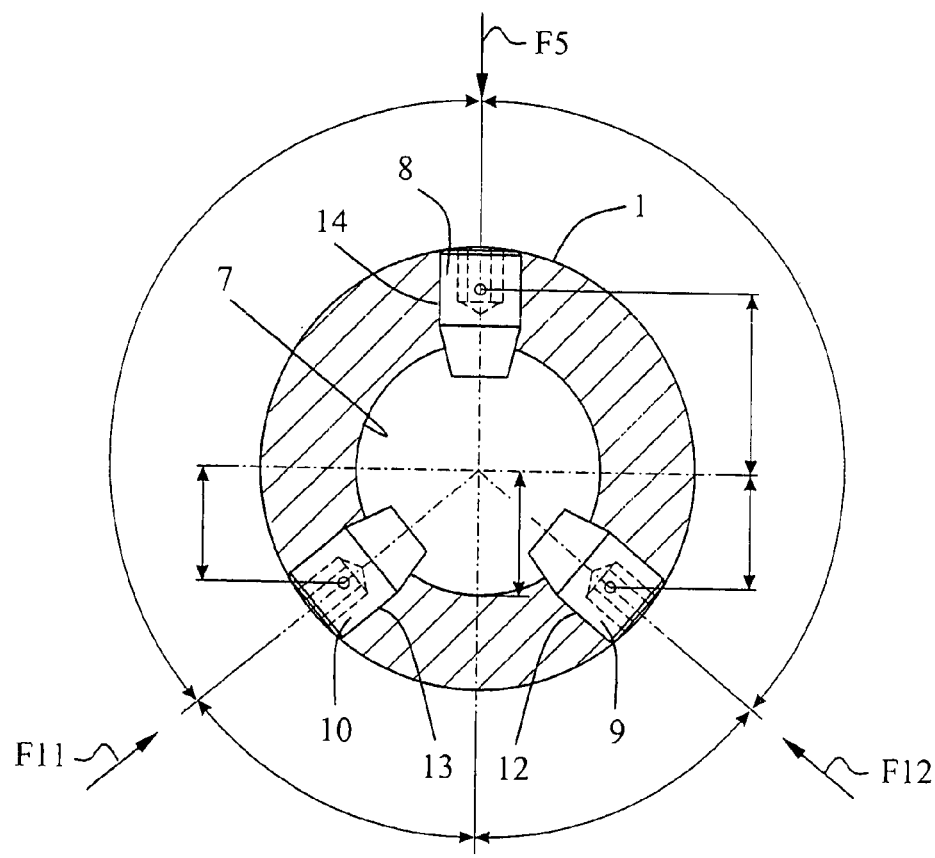
FIG. 9 depicts schematically a radial section through the second tool part.

In order to tension the two annular surfaces 5 and 6 against one another and, by so doing, to connect the two tools 2 and 3 securely to one another, three securing screws 8, 9 and 10 are provided as tensioning means, which according to FIGS. 1, 6 and 9 are arranged distributed around the periphery of the second tool part 3. The arrangement is axially symmetrical according to FIGS. 1, 6 and 9. The angles W1 and W2 depicted in FIG. 1 are identical, and the angle W3 is smaller than 120° and greater than 90°. The angles W1 and W2 are preferably greater than 125° and, in particular, are approximately 130°. The angle W3 is preferably smaller than 105° and preferably greater than 95°. There is an even greater preference for the angle W3 to be approximately 100°.

The retaining screws 8, 9 and 10 are screwed in each case into a radial bore 12, 13 and 14, as depicted in FIGS. 1 and 9. These bores 12, 13 and 14 are threaded bores, which pass radially through a wall 20 of the second tool part 3 in each case according to FIG. 1. The retaining screws 8, 9 and 10 can be operated, for example, with an Allen key (not illustrated here). On the front end surface, these retaining screws 8, 9 and 10 in each case possess an external cone 11, which engages in each case in a radial bore 21, 22 and 23 in the alignment pin 4. These bores 21, 22 and 23 are provided in each case with a conical surface 15, which is of a corresponding execution to the external cone 11. The axes of the retaining screws 8, 9 and 10 are displaced in each case in relation to the axes of the bores 21, 22 and 23 according to FIG. 2 by the distance D in the direction of an axis of rotation A in each case. In conjunction with screwing in the retaining screws 8, 9 and 10, the force F7 in each case acts upon these retaining screws. These forces F7 in each case possess a radial force component F5 and an axial force component F6. The force component F6 acts upon the alignment pin 4 in an axial direction.

In conjunction with tightening the two retaining screws 9 and 10, in addition to the aforementioned axial force F6 (FIG. 7), the radial force F5 also arises, which produces a frictional force F9 indicated in FIG. 7 between the alignment pin 4 and the bore 7. According to FIG. 7 and FIG. 10, forces F9 and F10, which in total are greater than the force produced by the retaining screw 8, arise as a consequence of the aforementioned arrangement of the angles W1, W2 and W3. The effect of the two forces F9 and F10 in the axial direction compensates for the frictional force F9. By selecting the angle W3 so that it is smaller than 1200 and greater than 90°, the surface pressure imposed by the forces F8, F9 and F10 can be compensated for symmetrically. Accordingly, the bending moment in relation to the axis of rotation A is neutral. The achievable high symmetrical surface pressure brings about an advantageous, axially parallel connection of the two tool parts 2 and 3.

Figure 2:
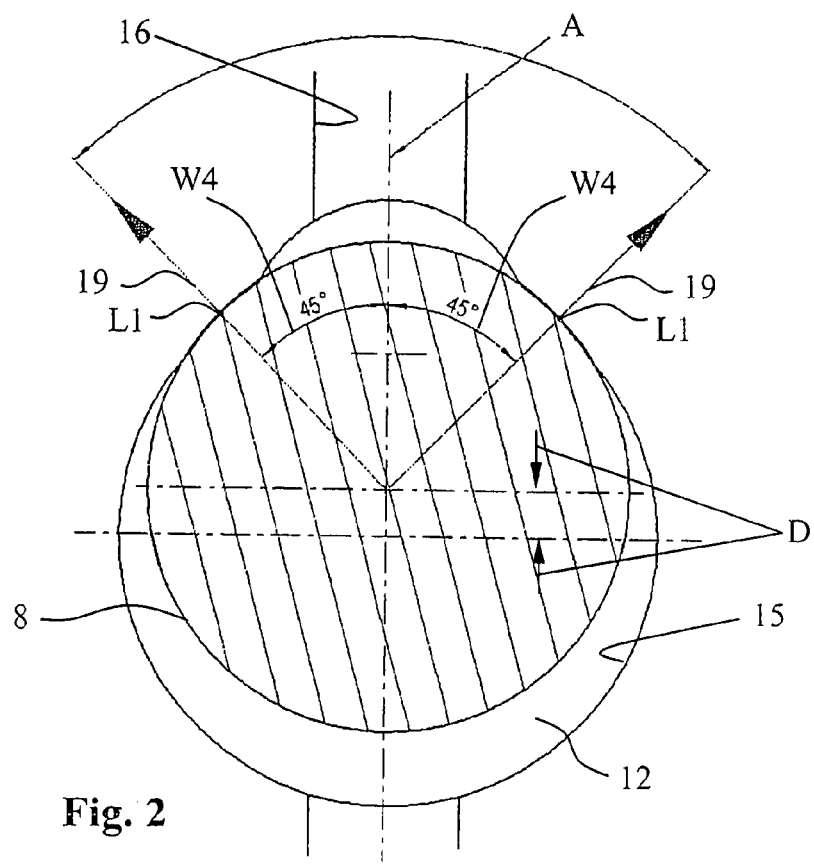
FIG. 2 depicts schematically the location of a retaining screw in a bore in the alignment pin.
Figure 3:
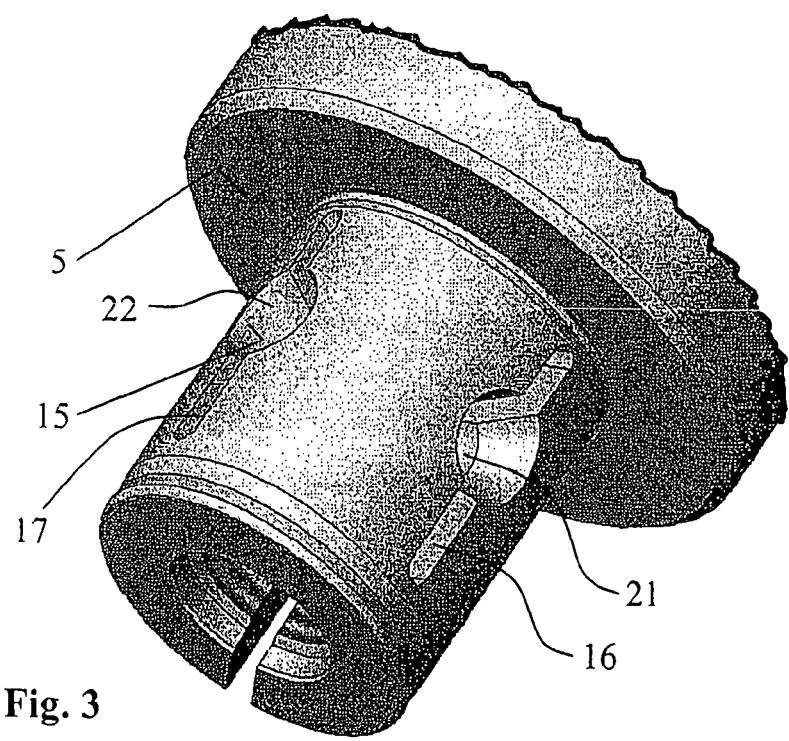
FIG. 3 depicts a three-dimensional view of the alignment pin.
Figure 4:
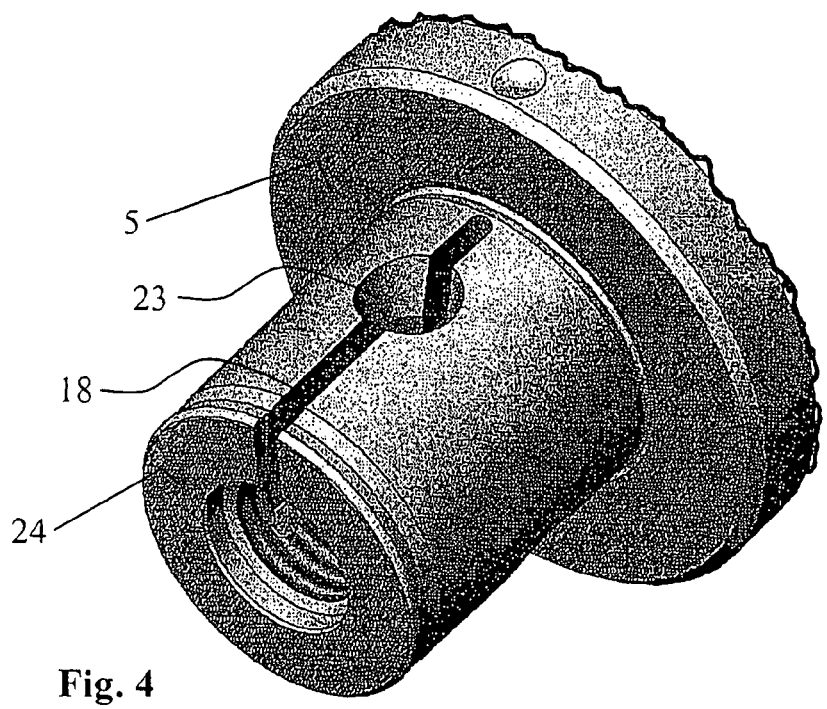
FIG. 4 depicts a further three-dimensional view of the alignment pin.

The alignment pin 4 exhibits at its periphery three recesses 16, 17 and 18, which in each case pass through one of the bores 21, 22 and 23. It is apparent that these recesses 16, 17 and 18 are in the form of slots and pass radially through the wall 20. The recesses 16, 17 and 18 are preferably open slots having a width of 0.2 to 0.4 mm and preferably approximately 0.3 mm and are preferably produced with a laser. However, the recesses 16, 17 and 18 can also be milled slots with a width of about 1 mm to 5 mm. They extend axially, in conjunction with which the recess 18 is open at an end surface 24 of the alignment pin 4. The two other slots 16 and 17, on the other hand, are not axially transcurrent or transcurrent. If the retaining screws 8, 9 and 10 are tightened against the alignment pin 4, the alignment pin 4 is drawn axially through the bore 7 of the second tool part 3. The retaining screws 8, 9 and 10 in this case, as illustrated in FIG. 2 and FIG. 6, bear against two surfaces L1 of the conical surface 15 and, in so doing, exert forces in the direction of the arrows 19 on the alignment pin 4 at an angle W4 of about 90° in relation to one another. The recesses 16, 17 and 18 are caused to expand by these forces in the peripheral direction of the alignment pin 4. The alignment pin 4 is accordingly elastically deformed in each case in the area of the recess 16, 17 and 18. The deformation is polygonal according to the arrangement of the retaining screws 8, 9 and 10. The periphery of the alignment pin 4 is distorted accordingly in a polygonal manner and is pressed against the bore 7 of the second tool part 3. The wall 20 of the second tool part 3 is also caused to deform elastically by the stress imparted by the retaining screws 8 to 10, although to a significantly smaller degree, because recesses corresponding to the recesses 16 to 18 are not provided here. The clearance of the alignment pin 4 in the axial bore 7 is eliminated in this way. A very stable connection between the two tool parts 2 and 3 results from the distribution of the corresponding contact areas on the periphery of the alignment pin 4 depicted in FIG. 6. As illustrated in FIG. 6, forces F1 and F2 are required for the expansion of the alignment pin 4, and forces F3 and F4 are required for the pressing of the alignment pin 4 on its periphery.

Figure 8:
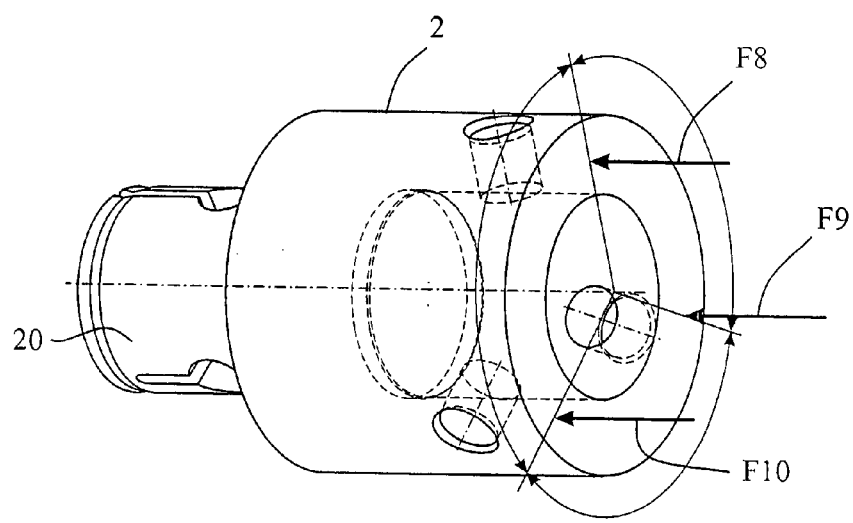
FIG. 8 depicts a schematic three-dimensional view of the first tool part.
Figure 10:
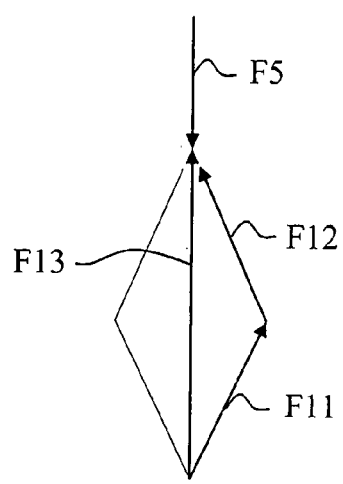
FIG. 10 depicts a force parallelogram.

The forces indicated in FIGS. 8 to 10 bring about a homogenous surface pressure on the annular surfaces 5 and 6. The forces F5, F11 and F12 occur in a radial direction in conjunction with tightening the tensioning screws 8, 9 and 10. As a consequence of the conical configuration of the tensioning screws 8, 9 and 10, the effective force for each tensioning screw can be split into a radial force and an axial force. The forces F8, F9 and F10 indicated in FIG. 8, which produce a regular and homogeneous surface pressure distributed over the annular surfaces 5 and 6, are ultimately fundamental.

The force F13 resulting from the forces F11 and F12 represented schematically in FIG. 10 is greater than the counterforce F5. In the interests of clarity, the angle between the forces F11 and F12 is shown in FIG. 10 to be greater than the preferred angle of 100°. The frictional force F9 (FIG. 7) and the axial components of the forces F5, F12 and F13 are compensated for respectively as a result of the increased force F13. Accordingly, the surface pressure on the annular surfaces 5 and 6 is homogeneous.

The recesses 16, 17 and 18 also extend outwards, as can be appreciated, in the direction of the annual surface 5 in each case via a bore 21, 22 and 23. The bulges accordingly extend axially essentially from the end surface 24 to the annular surface 5. These areas are accordingly not selective, but are linear in form. This results in particularly high rigidity and stability and effective vibration damping for the connection.

The tool 1 is characterized in addition by its high compatibility. In particular, the first tool part 2 can also be connected to a second tool part 3 which only exhibits a single retaining screw 8, 9 or 10.

| List of reference designations | |
|---|---|
| 1 | device |
| 2 | first tool part |
| 3 | second tool part |
| 4 | alignment pin |
| 5 | annular surface |
| 6 | annular surface |
| 7 | axial bore |
| 8 | retaining screw |
| 9 | retaining screw |
| 10 | retaining screw |
| 11 | external cone |
| 12 | bore |
| 13 | bore |
| 14 | bore |
| 15 | surface |
| 16 | recess |
| 17 | recess |

-continued

List of reference designations

| | |
|---|---|
| 18 | Recess |
| 19 | Arrow |
| 20 | Wall |
| 21 | Bore |
| 22 | Bore |
| 23 | Bore |
| 24 | end surface |
| 25 | cutter carrier |
| A | axis of rotation |
| D | Distance |
| L1 | Line |
| W1 | Angle |
| W2 | Angle |
| W3 | Angle |
| W4 | Angle |

The invention claimed is:

1. A tool for cutting machining, having a first tool part and having a second tool part, which exhibit a common axis of rotation, the first tool part exhibiting an alignment pin and, at a root of the alignment pin, an annular surface, and the second tool part exhibiting an axial bore to receive the alignment pin and an annular surface, which is capable of being tensioned against the annular surface of the first tool part with tensioning means for the axial tensioning of the two tool parts to one another, the tensioning means exhibiting three retaining screws arranged distributed around the periphery of the second tool part, which retaining screws are each screwed radially into a threaded bore of the second tool part (3) and each engage in a radial bore of the alignment pin, wherein the angle between a first retaining screw and a second retaining screw is smaller than 120° and larger than 90°, and in that the angle between the first retaining screw and the third retaining screw is identical with the angle between the third retaining screw and the second retaining screw.

2. The tool as claimed in claim 1, wherein the angle between the first retaining screw and the second retaining screw lies in the range from 95° to 105°.

3. The tool as claimed in claim 1, wherein the angle between the first retaining screw and the second retaining screw is in the order of 100°.

4. The tool as claimed in claim 1, wherein a recess in the alignment pin is allocated to each radial bore, so that the alignment pin is capable of being caused to bulge at its periphery by tensioning the retaining screws.

5. The tool as claimed in claim 4, wherein the recesses in the alignment pin extend axially through the bores of the alignment pin.

6. The tool as claimed in claim 4, wherein at least one recess in the alignment pin is open at an end surface of the alignment pin.

7. The tool as claimed in claim 4, wherein the recesses are slots with a width of 0.2 to 0.4 mm.

8. The tool as claimed in claim 7, wherein the recesses have a width of approximately 0.3 mm.

9. The tool as claimed in claim 8, wherein the recesses are produced with a laser.

10. The tool as claimed in claim 4, wherein the recesses are slots with a width of about 1 mm to 5 mm.

* * * * *

UNITED STATES PATENT AND TRADEMARK OFFICE
CERTIFICATE OF CORRECTION

PATENT NO.         : 7,281,888 B1                                    Page 1 of 1
APPLICATION NO. : 11/704801
DATED              : October 16, 2007
INVENTOR(S)        : Heinz Kaiser, Ernst Hänggi and Rudolf Stadelmann It is certified that error appears in the above-identified patent and that said Letters Patent is hereby corrected as shown below:

Column 3, line 37, "1200" should read --120°--

Signed and Sealed this

Twenty-first Day of October, 2008

JON W. DUDAS
*Director of the United States Patent and Trademark Office*